United States Patent [19]

Meininger et al.

[11] Patent Number: 4,515,598

[45] Date of Patent: May 7, 1985

[54] PROCESS FOR DYEING AND PRINTING FIBER MATERIALS CONTAINING HYDROXY AND/OR CARBONAMIDE GROUPS WITH REACTIVE DYE CONTAINING BOTH VINYL SULPHONYL AND FLUORO-TRIAZINYL GROUPS

[75] Inventors: Fritz Meininger, Frankfurt am Main; Joachim W. Otten, deceased, late of Offenbach am Main; by Ursula Otten, heir, Heidelberg; by Anna G. Rudolph née Otten, heir, Dillenburg, all of Fed. Rep. of Germany

[73] Assignee: Hoechst Aktiengesellschaft, Frankfurt, Fed. Rep. of Germany

[21] Appl. No.: 550,727

[22] Filed: Nov. 10, 1983

Related U.S. Application Data

[63] Continuation of Ser. No. 465,509, Feb. 10, 1983, abandoned, which is a continuation of Ser. No. 340,846, Jan. 20, 1982, abandoned, which is a continuation of Ser. No. 267,780, May 22, 1981, abandoned.

[30] Foreign Application Priority Data

May 24, 1980 [DE] Fed. Rep. of Germany ....... 3019960

[51] Int. Cl.$^3$ .......... C09B 62/04; D06P 1/38; D06P 3/66
[52] U.S. Cl. .......... 8/549; 8/531; 8/681; 8/685; 8/688; 8/692; 8/917; 8/918; 8/924
[58] Field of Search .......... 8/549, 681, 688, 685

[56] References Cited

U.S. PATENT DOCUMENTS 4,341,699 7/1982 Tezuka et al. .......... 260/153
4,378,313 3/1983 Kayane et al. .......... 260/153

FOREIGN PATENT DOCUMENTS 36582 9/1981 European Pat. Off. .
113251 7/1984 European Pat. Off. .
1265698 4/1968 Fed. Rep. of Germany .
1408025 10/1975 United Kingdom .
2026527 2/1980 United Kingdom .

Primary Examiner—A. Lionel Clingman
Attorney, Agent, or Firm—Curtis, Morris & Safford

[57] ABSTRACT

A process for dyeing or printing fiber materials containing hydroxy and/or carbonamide groups, in which process a fiber-reactive, water-soluble dyestuff of the type defined below is applied to the fiber material and is then fixed on the fiber material at an ordinary or elevated temperature, if appropriate in the presence of agents having an alkaline reaction. This water-soluble dyestuff, which contains at least one sulfonic acid group, contains one or more groupings belonging to the group comprising the formulae (1a), (1b) and (1c)

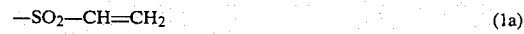

$$-SO_2-CH=CH_2 \qquad (1a)$$

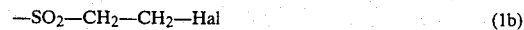

$$-SO_2-CH_2-CH_2-Hal \qquad (1b)$$

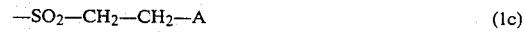

$$-SO_2-CH_2-CH_2-A \qquad (1c)$$

(in which Hal represents a halogen atom and A represents the acyloxy radical of a monobasic or polybasic acid) and also contains, linked to it, a 6-fluoro-1,3,5-triazin-2-ylamino radical, this monofluorotriazinylamino radical containing, in the 4-position, a substituent which is not an N-phenylamino or N-naphthylamino substituent having a group belonging to the above-mentioned formulae (1) attached to the optionally substituted phenyl radical or optionally substituted naphthyl radical, and is also not an amino substituent containing an azo group. Dyestuffs of this type can belong to a very wide variety of classes of dyestuffs and can be both metal-free dyestuffs and metal complex dyestuffs. With the aid of these dyestuffs and using alkaline agents, this dyeing process produces deep dyeings and prints which have good fastness properties on these fiber materials, even at low temperatures.

3 Claims, No Drawings

PROCESS FOR DYEING AND PRINTING FIBER MATERIALS CONTAINING HYDROXY AND/OR CARBONAMIDE GROUPS WITH REACTIVE DYE CONTAINING BOTH VINYL SULPHONYL AND FLUORO-TRIAZINYL GROUPS

This is a continuation of application Ser. No. 465,509 filed Feb. 10, 1983, now abandoned, which in turn is a continuation of application Ser. No. 340,846 filed Jan. 20, 1982, now abandoned which in turn is a continuation of application Ser. No. 267,780 filed May 22, 1981, now abandoned.

The invention falls within the technical field of using fiber-reactive dyestuffs for dyeing fiber materials.

Dyestuffs containing a fiber-reactive radical belonging to the vinyl sulfone series and, as a further fiber-reactive radical, a monohalogenotriazinyl radical are disclosed in German Patent Specification No. 1,265,698 and German Offenlegungsschrift No. 2,927,102; they are employed in dyeing processes for dyeing, for example, fiber material containing hydroxy groups. However, the use of these dyestuffs in dyeing processes is associated with certain drawbacks.

With the aid of the present invention, a process for dyeing and printing fiber materials containing hydroxy and/or carbonamide groups, which produces fast dyeings and prints, has now been found, which comprises applying, as a dyestuff, to the fiber material, a water-soluble dyestuff containing one or more groupings belonging to the group comprising the formulae (1a), (1b) and (1c)

$$-SO_2-CH=CH_2 \quad (1a)$$

$$-SO_2-CH_2-CH_2-Hal \quad (1b)$$

$$-SO_2-CH_2-CH_2-A \quad (1c)$$

(in which Hal represents a halogen atom and A represents the acyloxy radical of a monobasic or polybasic acid), and a 6-fluoro-1,3,5-triazin-2-ylamino radical in which the substitutent located in the 4-position is not an N-phenylamino or N-naphthylamino substituent, unsubstituted or substituted, to which is bound a group belonging to the abovementioned formulae (1) or in which said 4-substitutent, preferably, is not an amino substituent containing an optionally substituted benzene or naphthalene radical to which a group belonging to the above-mentioned formulae (1) is linked, and is not an amino substituent containing an azo group, this water-soluble dyestuff also containing at least one sulfonic acid group, and then fixing this dyestuff on the fiber material at room- or elevated temperature, either in the absence or in the presence of an agent having an alkaline reaction.

In formula (1b), Hal is preferably a chlorine atom. Examples of monobasic or polybasic acids of the acyloxy radical A are sulfuric acid, thiosulfuric acid, phosphoric acid, acetic acid, propionic acid, benzenesulfonic acid, the toluenesulfonic acids, benzoic acids and sulfobenzoic acids. A preferably represents the sulfato, thiosulfato, phosphato or acetoxy radical.

The monofluorotriazinylamino radical is preferably a radical of the formula (2)

in which the symbols have the following meanings: R is a hydrogen atom or an alkyl group of 1–4 C atoms, such as a methyl or ethyl group; Y is a radical of the formula (3a), (3b) or (3c)

$$-O-R^1 \quad (3a)$$

$$-S-R^1 \quad (3b)$$

$$-N\begin{matrix}R^2\\R^3\end{matrix} \quad (3c)$$

in which $R^1$ represents an optionally substituted alkyl radical of 1 to 4 C atoms or an optionally substituted aromatic carbocyclic or aromatic heterocyclic radical, $R^2$ is a hydrogen atom or an optionally substituted lower aliphatic radical or a cycloaliphatic radical and $R^3$ is a hydrogen atom or an optionally substituted lower aliphatic radical or an optionally substituted aromatic carbocyclic radical which, however, does not contain, linked to it, an azo group, or a group of the formula (1a), (1b) or (1c), in the event that it is a phenyl or naphthyl radical, or $R^3$ denotes a lower alkoxy group, a cyano group, a group of the formula $-C-S-NH_2$ or an optionally substituted amino group, or in which $R^2$ and $R^3$, together with the nitrogen atom, form a ring containing lower alkyl and optionally one or two heteroatoms, such as a nitrogen or oxygen atom, such as form, for example, a morpholine, piperidine or piperazine ring.

Lower aliphatic radicals are, in particular, lower alkyl and alkenyl radicals. Here, and in the following text, the term "lower" used in the above definitions denotes that the alkyl or alkylene or alkenyl radical contained in the group contains 1 to 4 C atoms.

Examples of substituted lower alkyl radicals are alkyl groups which have 1 to 4 C atoms and are substituted by one or two substituents belonging to the group comprising acetylamino, hydroxy, sulfato, β-sulfatoethylsulfonyl, β-thiosulfatoethylsulfonyl, lower alkoxy, sulfo, carboxy, phenyl, naphthyl, phenyl which is substituted by sulfo, carboxy, β-sulfatoethylsulfonyl, β-thiosulfatoethylsulfonyl, methyl, ethyl, methoxy, ethoxy, chlorine, sulfamoyl and/or carbamoyl, and naphthyl which is substituted by sulfo, carboxy, β-sulfatoethylsulfonyl, β-thiosulfatoethylsulfonyl, sulfamoyl and/or carbamoyl. An example of a cycloaliphatic radical is the cyclohexyl radical. Aromatic carbocyclic radicals are preferably the phenyl radical and the naphthyl radical; these can be substituted, for example, by substitutents belonging to the group comprising carboxy, sulfo, lower alkyl, lower alkoxy, hydroxy, chlorine and β-sulfatoethylsulfonyl.

Examples of optionally substituted amino groups as groups of the formula radical $R^3$ are the amino group itself, a lower alkylamino group, a dialkylamino group in which each of the radicals is lower alkyl, an N-methyl-N-phenylamino group or the phenylamino group or a phenylamino group which is substituted in the phenyl radical by substitutents belonging to the group comprising sulfo, carboxy, chlorine, lower alkyl and lower alkoxy.

Suitable dyestuffs of the type described which can be employed in the process according to the invention belong to a very wide variety of classes of dyestuffs, such as monoazo dyestuffs, disazo dyestuffs or trisazo dyestuffs, and metal complex compounds thereof, such as those of copper, cobalt, chromium and nickel, and also anthraquinone dyestuffs, phthalocyanine dyestuffs which are metal-free or contain a metal linked as a complex, such as the copper phthalocyanine and nickel phthalocyanine dyestuffs, metal-free and metal-containing formazan dyestuffs, such as copper formazan dyestuffs, dioxazine dyestuffs, azine dyestuffs, nitro dyestuffs and stilbene dyestuffs.

The process of the invention is preferably carried out with the use of dyestuffs of the said type which belong to the class comprising the monoazo dyestuffs, the class comprising copper, cobalt and chromium complex monoazo dyestuffs, the class comprising anthraquinone dyestuffs and the class comprising copper phthalocyanine and nickel phthalocyanine dyestuffs and the class of copper formazan dyestuffs.

The dyestuffs which are employed in accordance with the invention can be prepared, for example, in the following manner: 1 mole of cyanuric fluoride is initially reacted, in a first stage, with one mole of a compound of the formula (4a), (4b) or preferably (4c)

 (4a)

 (4b)

 (4c)

in which $R^1$, $R^2$ and $R^3$ have the abovementioned meanings; the compound thus prepared is then reacted, in a second stage, with one mole of a dyestuff molecule containing an acylatable amino group and at least one group of the above formula (1a), (1b) or (1c). If azo dyestuffs are involved, the condensation product from the first stage can be reacted in the second stage with one mole of a diazo or coupling component containing an acylatable amino group which is not required for the diazotization or coupling reaction, and the corresponding dyestuffs can then be prepared by azo coupling, selecting the components in such a manner that the finished dyestuff contains, at least once in the molecule, a group of the formula (1a), (1b) or (1c) and a group of the formula (2).

It is also possible to carry out the condensation reaction of the components with cyanuric fluoride in the reverse sequence. It is also possible to subject the said primary condensation products formed from cyanuric fluoride and compounds of the formulae (4a), (4b) or (4c) to a condensation reaction with dyestuff molecules which contains amino groups and which already contain a grouping of the formula (1a), (1b) or (1c). If groups capable of forming metal complexes are present in the resulting dyestuffs, the dyestuffs can also be metallized subsequently.

The procedures outlined here for preparing the dyestuffs which are employed in the process according to the invention do not exhaust the possibilities of synthesizing these dyestuffs. In principle, these dyestuffs, of every class of dyestuff, can be prepared analogously to known procedures by using, as starting products for such dyestuffs, in a manner which is in itself known or in a manner analogous to known procedures, precursors or intermediate products containing such fiber-reactive radicals of the formula (1) and/or (2), or by introducing these fiber-reactive radicals into precursors or intermediate products which are suitable for this purpose and which optionally already have the character of a dyestuff.

Amongst the dyestuffs which can be employed and used in accordance with the process of the invention the following groups of dyestuffs (which are written in the form of the free acids and are preferably employed as salts, such as, in particular, sodium or potassium salts) can be singled out:

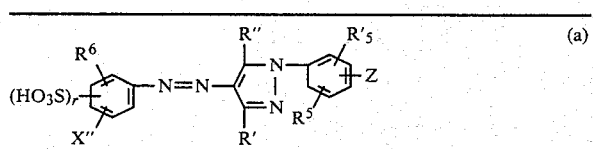 (a)

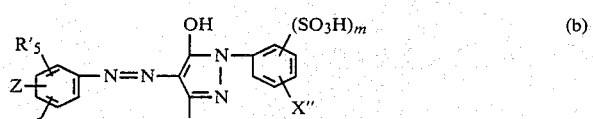 (b)

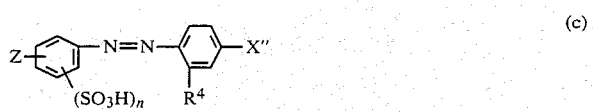 (c)

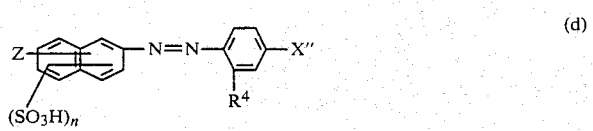 (d)

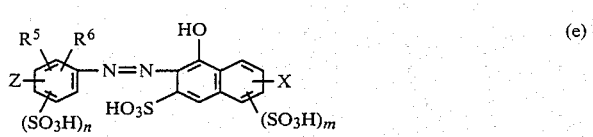 (e)

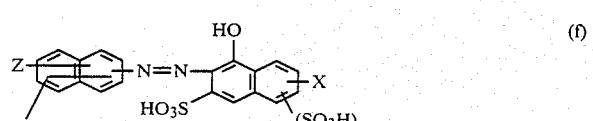 (f)

The 1:1 copper complexes, 1:2 chromium complexes or 1:2 cobalt complexes of the compounds of the formula (g)

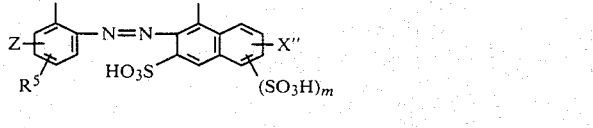

The 1:1 copper complexes, 1:2 chromium complexes or 1:2 cobalt complexes of the compounds of the formula (h)

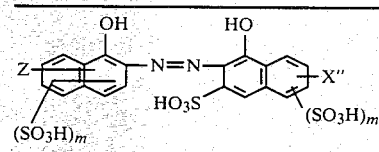 (i)

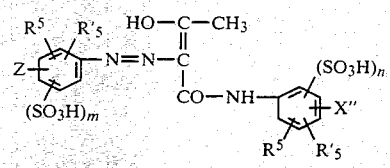 (j)

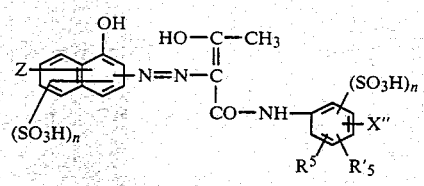 (k)

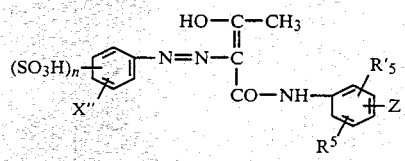 (l)

The 1:1 copper complexes, 1:2 chromium complexes or 1:2 cobalt complexes of the compounds of the formula

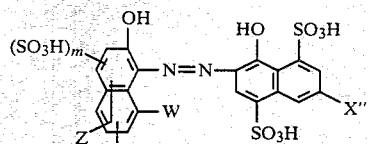 (m)

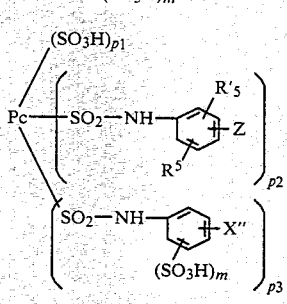 (n')

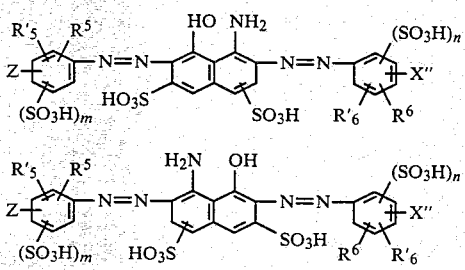 (n")

The 1:1 copper complexes, 1:2 chromium complexes or 1:2 cobalt complexes of the compounds of the formula

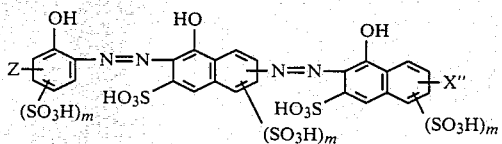 (o)

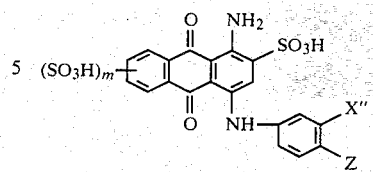 (p)

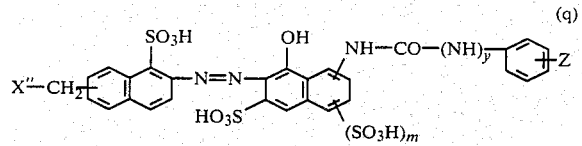 (q)

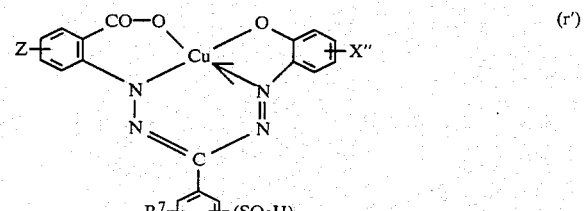 (r')

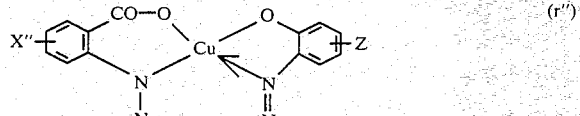 (r")

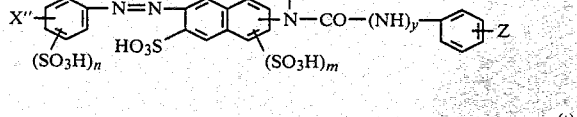 (s)

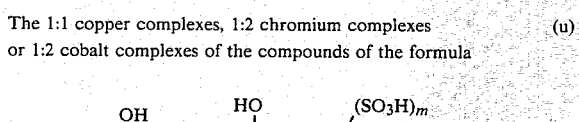 (t)

The 1:1 copper complexes, 1:2 chromium complexes or 1:2 cobalt complexes of the compounds of the formula (u)

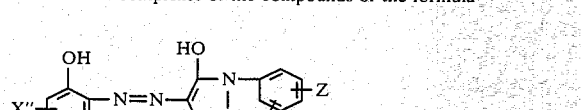

The 1:1 copper complexes, 1:2 chromium complexes or 1:2 cobalt complexes of the compounds of the formula (v)

-continued

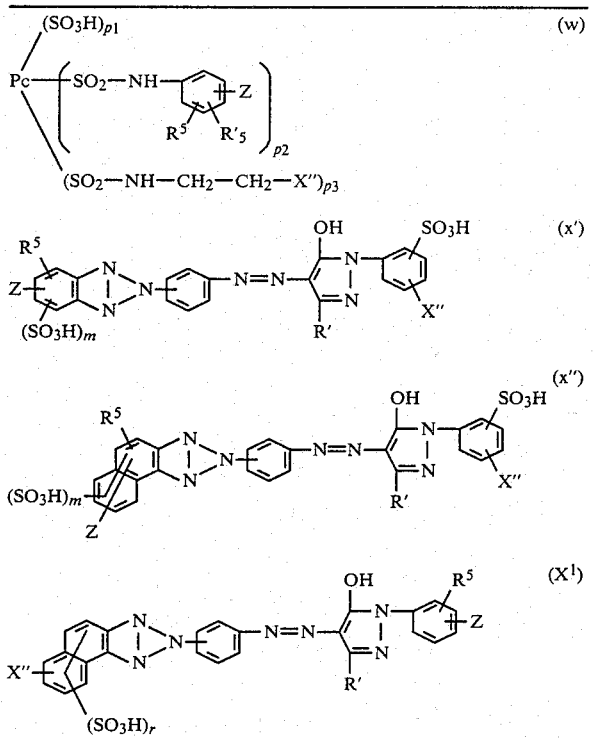

The 1:1 copper complexes, 1:2 chromium complexes or 1:2 cobalt complexes of the compounds of the formula (y)

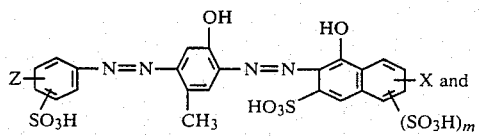

The 1:1 copper complexes, 1:2 chromium complexes or 1:2 cobalt complexes of the compounds of the formula (z)

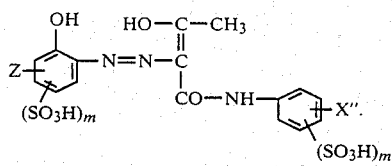

In these formulae, the symbols have the following meanings: X is a group of the general formula (2) in which R and Y have the abovementioned meanings, R being preferably hydrogen or methyl; X'' is a group of the general formula (2) in which R is hydrogen and Y has the abovementioned meaning; Z is a group of the general formula (1a), (1b) or (1c) in which Hal and A have the abovementioned meanings; m is the number zero or 1, this group representing a hydrogen atom in the event that m is zero; n is the number zero, 1 or 2, this group representing a hydrogen atom in the event that n is zero, $p_1$, $p_2$ and $p_3$ are identical or different from one another and each is a number from 1 to 2, the total of $(p_1+p_2+p_3)$ not exceeding 4; r is the number 1 or 2; y is the number zero or 1; R' is the methyl, carboxy, carbomethoxy or carboethoxy group; R'' is the amino or hydroxy group; $R^4$ is the amino, acetylamino or ureido group; $R^5$ is a hydrogen atom or the methyl, methoxy, ethyl, ethoxy, hydroxy or carboxy group; $R'_5$ is a hydrogen atom or the methyl, methoxy, ethyl, ethoxy, hydroxy or carboxy group; $R^6$ is a hydrogen or chlorine atom or the methyl, methoxy, ethyl, ethoxy, hydroxy or carboxy group; $R'_6$ is a hydrogen or chlorine atom or the methyl, methoxy, ethyl, ethoxy, hydroxy or carboxy group; $R^7$ is a hydrogen atom or a chlorine atom; $R^8$ is a hydrogen atom or the methyl group; W is a hydrogen atom or the hydroxy group; Pc is a metal-free or metal-containing phthalocyanine radical, preferably the copper phthalocyanine or nickel phthalocyanine radical; and the formula units R', R'', $R^4$, $R^5$, $R'_5$, $R^6$, $R'_6$, $R^7$, $R^8$, Y and W and also m, n, $p_1$, $p_2$, $p_3$, r and y can be identical to one another or different from one another.

The process according to the invention is used to produce dyeings (including prints) on fiber materials, containing hydroxy and/or carbonamide groups, of all kinds. Examples of such fiber materials are the natural cellulose fibers, such as cotton, linen and hemp, and also regenerated cellulose. The process according to the invention is similarly suitable for dyeing fibers which contain hydroxyl groups and which are present in blended fabrics, such as, for example, mixtures of cotton and polyester fibers or polyamide fibers.

The dyestuffs used in accordance with the invention can be applied to the fiber material and fixed on the fiber in various ways, especially in the form of dyestuff solutions and dyestuff printing pastes.

The dye liquors and printing pastes containing the dyestuff and the acid-binding agent can be applied to the material to be dyed within the wide range of temperatures, preferably at room temperature (15° to 30° C.) or at a temperature up to 60° C. It is appropriate to carry out this operation by impregnating the fiber material with the dye liquids, optionally containing neutral salts, and squeezing the material out, for example padding in a customary manner and, if appropriate after a prior intermediate drying, subjecting the material to a heat treatment in order to fix the dyestuffs. Prints are produced in a similar manner by printing the fiber material with the said printing pastes, giving it an intermediate drying and subjecting it to a heat treatment in order to fix the dyestuffs. However, depending on the concentration and the type of the acid-binding agent, it is also possible to effect the fixing of the dyestuffs at, for example, 20° to 60° C. by leaving the impregnated or printed, moist fiber material for several hours at room temperature or at an elevated temperature (the so-called pad-dwell process). Fixing the dyeings and prints in an alkaline pH range by heat treatment can be effected by various methods which are customary in the art, for example by steaming with saturated steam at approximately 100° to 103° C. or with superheated steam at a temperature up to 150° C., with hot air at a temperature from 120° to 230° C. (thermofixing), by infrared irradiation, by passing the material through hot solutions of a high salt content or through hot vapors of inert organic solvents or by passing the padded or printed web of fabric over a number of heated rollers.

Examples of acid-binding agents which are used for carrying out the process according to the invention in an alkaline pH range are sodium hydroxide, potassium hydroxide or an alkali mtal salt of a weak acid, such as sodium carbonate or bicarbonate, trisodium phosphate, disodium phosphate, sodium metasilicate or sodium trichloroacetate or mixtures of these acid-binding agents.

However, the acid-binding agent can also be applied to the fiber material, for example by spraying or padding by means of an aqueous solution of the agent before or after the application of the dye liquors or printing pastes, which in this case do not contain this agent. The solutions of these agents can also contain additives which are generally customary, such as, for example, those which have already been mentioned above. If these agents are applied to the material to be dyed at the same time as the dyestuff, it is appropriate to dissolve them in the dye liquor or in the printing paste containing the dyestuff.

The dye liquors and printing pastes can contain the additives which are generally customary, in the case of the solutions, for example, inorganic salts, such as alkali metal chlorides or alkali metal sulfates, urea, alginate thickeners, water-soluble cellulose alkyl ethers and dispersing agents and leveling auxiliaries, in the case of the printing pastes, for example, urea, sodium m-nitrobenzenesulfonate and the customary thickeners, such as methylcellulose, starch ethers, emulsion thickeners or, preferably, an alginate, for example sodium alginate.

If dye liquors or printing pastes are used which are virtually neutral and contain no alkaline agents, it is advantageous to carry out the fixation by introducing the dyed goods into the a bath which contains salt and contains the acid-binding or alkali-donating agent, and, after squeezing out and optionally after an intermediate drying, subjecting the dyed goods to the heat treatment.

Amongst these procedures of the process according to the invention, the preferred procedure is the padd-well process mentioned, particularly at a dwell temperature of 20°–25° C. and using sodium carbonate, tertiary sodium phosphate, sodium hydroxide (solution) or mixtures of these as the acid-binding agents.

If the process according to the invention is carried out by the direct dyeing method (exhaustion process), it is preferably effected in an alkaline pH range. The temperatures selected for this method are between 30° and 80° C. The dyebath then contains one or more of the above-mentioned acid-binding agents and the additives which may be customary, such as inorganic salts, urea and other auxiliaries out of those mentioned above. The exhaustion process is a preferred variant of the process according to the invention. The temperature of dyeing is preferably 40°–60° C., and the acid-binding agent which is used preferentially is sodium carbonate or sodium hydroxide (as aqueous solution) or both at the same time.

The process according to the invention is also used to produce dyeings on fiber materials, containing carbonamide groups, of all kinds. Examples of such fiber materials are natural and synthetic polyamide fibers, in particular wool. The process according to the invention is similarly suitable for dyeing fibers which contain carbonamide groups and which are present in mixed fabrics, such as, for example, mixtures of wool and polyester fibers or polyamide fibers. These fiber materials are dyed or printed with the reactive dyestuffs which are used in accordance with the invention, by the dyeing and printing methods customary for this operation, in an acid to neutral pH range, and it can in some cases be advantageous to increase the pH value at the end of about 6.5 to 8.5.

The dyeings and prints conducted by means of the dyestuffs used in accordance with the invention are distinguished by clear shades. In particular, the dyeings and prints produced on cellulose fiber materials have a good depth of color and also good fastness to light and very good fastness properties to wet processing, such as fastness to washing, water, sea water, cross-dyeing and perspiration, and also good fastness to pleating, to ironing and to rubbing.

The examples which follow serve to illustrate the invention. Unless a note is made to the contrary, parts are parts by weight and percentages relate to percentages by weight. The relationship between parts by weight and parts by volume is that of kilograms to liters.

EXAMPLE 1

10 parts of dyestuff of the formula (written as the free acid)

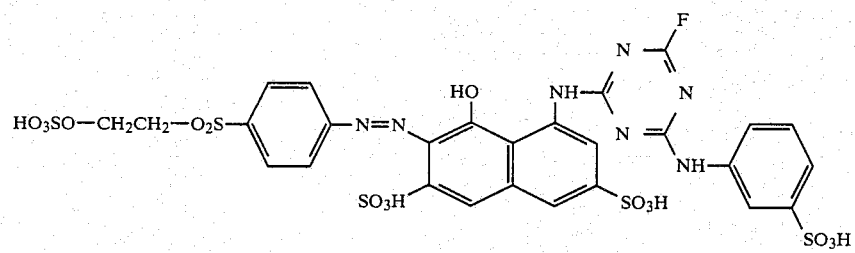

preferably as sodium or potassium salt (which can be obtained by coupling diazotized 4-β-sulfatoethylsulfonylaniline with 1-[6'-fluoro-4'-(3''-sulfophenylamino)-1',3',5'-triazin-2'-ylamino]-8-naphthol-3,6-disulfonic acid) and 5 parts of sodium hydroxide are dissolved in 1,000 parts of water. A cotton fabric is impregnated at 20° C. with the dye liquor thus obtained. After being impregnated, the fabric is squeezed to an increase in weight of about 80%. The goods are then rolled up on a roller, wrapped in a plastic film and left for about 16 hours at 18°–25° C., the roller being kept revolving. The goods are then acidified, rinsed in boiling water and dried. A clear, red dyeing which has good fastness properties, in particular good fastness to washing, is obtained.

A dyeing which is comparable in shade and in fastness properties is obtained if a corresponding quantity of potassium hydroxide is used instead of sodium hydroxide or if a dyestuff of the formula (written in the form of the free acid)

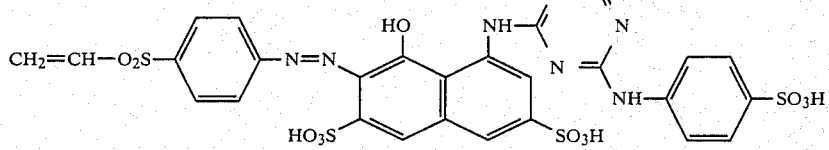

preferably as sodium or potassium salt, is used instead of the dyestuff indicated above.

EXAMPLE 2

A linen fabric is impregnated with a dyestuff solution containing 10 parts of the sodium salt of the dyestuff of the formula (written as the free acid)

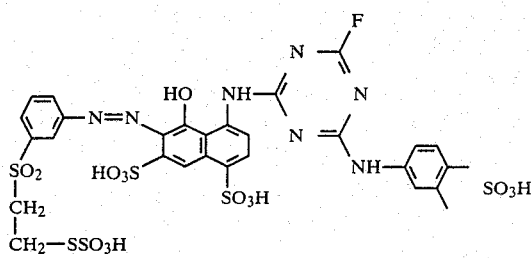

(which can be obtained by coupling diazotized 3-β-thiosulfatoethylsulfonylaniline with 1-(4',6'-difluoro-1',3',5'-triazin-2'-ylamino)-8-naphthol-4,6-disulfonic acid and subsequently subjecting the product to a condensation reaction with aniline-3-sulfonic acid and aniline-4-sulfonic acid), dissolved in 1,000 parts of water. After the material has been impregnated, the excess liquid is squeezed out to such an extent that the material retains about 80% of its weight of the dyestuff solution. The goods are then run onto a jigger and treated for 1 hour at 40° C. in a liquor containing 300 parts of sodium chloride and 5 to 10 parts of sodium hydroxide in 1,000 parts of water. The quantity of liquor used is such that 3 parts by volume of this liquor are used for one part of the goods (relative to dry weight). The dyed linen fabric is then acidified, rinsed with boiling water and dried. A deep yellowish-tinged red dyeing which has very good fastness to washing is obtained.

Deep yellowish-tinged red dyeings which have equally good fastness properties are obtained if 10 parts of a dyestuff of the formula (written as the free acid)

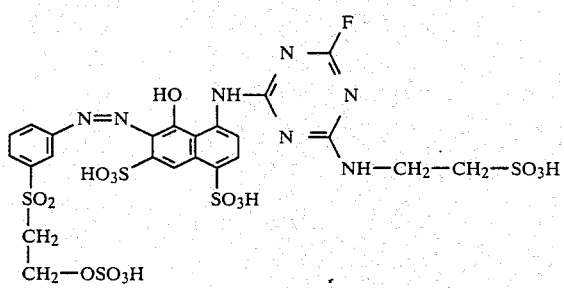

preferably as sodium or potassium salt (which can be obtained by coupling diazotized 3-β-sulfatoethylsulfonylaniline with 1-(4',6'-difluoro-1',3',5'-triazin-2'-ylamino)-8-naphthol-4,6-disulfonic acid and subsequently subjecting the product to a condensation reaction with 2-aminoethanesulfonic acid) are used instead of the dyestuff mentioned above, the procedure followed being in other respects as described above.

EXAMPLE 3

A cotton fabric is impregnated with a dyestuff solution containing 10 parts of the dyestuff of the formula (written as the free acid), preferably as Na-salt,

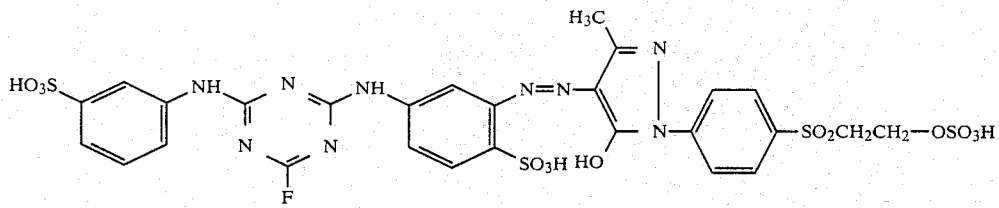

(which can be obtained by coupling diazotized 3-[4'-fluoro-6'-(3"-sulfophenylamino)-1',3',5'-triazin-2'-ylamino]-aniline-6-sulfonic acid with 1-(4'-β-sulfatoethylsulfonylphenyl)-3-methyl-5-pyrazolone) in 1,000 parts of water. After the fabric has been impregnated, it is squeezed out to a liquid pick-up of about 80%. The goods which have been impregnated in this way are dried and treated at room temperature with an aqueous alkaline salt solution containing, per liter, 250 parts of sodium chloride and 10 parts of sodium hydroxide. After being squeezed out to about 80% of liquid, the goods are steamed at 100° to 102° C. for 30 seconds and are acidified, rinsed at the boil and dried. A light-fast, yellow dyeing which has very good fastness to wet processing is obtained.

EXAMPLE 4

5 parts of the dyestuff of the formula (written as the free acid)

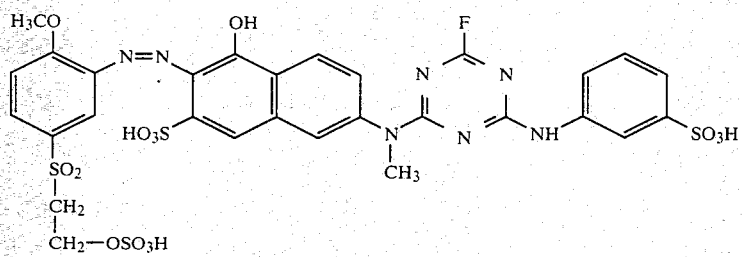

preferably as sodium or potassium salt (which can be obtained by coupling diazotized 2-methoxy-5-(β-sulfatoethylsulfonyl)-aniline with 2-[N-methyl-4'-fluoro-6'-(3''-sulfophenylamino)-1',3',5'-triazin-2'-ylamino]-5-naphthol-7-sulfonic acid) are dissolved, together with 50 parts of urea, in 200 parts of hot water. While stirring, 400 parts of a thickener composed of 40 parts of sodium alginate and 960 parts of water, and 20 parts of sodium bicarbonate are added to the solution. The mixture is then made up to 1,000 parts with water and thickener. A cotton fabric is printed with this printing paste and, after drying, is steamed at 101° to 103° C. for 5 minutes, is rinsed with cold water and then with hot water, soaped at the boil, rinsed again and dried. A yellowish-tinged red print which has very good fastness to wet processing is obtained.

EXAMPLE 5

100 parts of a staple rayon fabric are treated for one hour, at 20° C. and while being agitated thoroughly, with 1,000 parts by volume of a liquor containing 3 parts of the dyestuff of the formula (written in the form of the free acid)

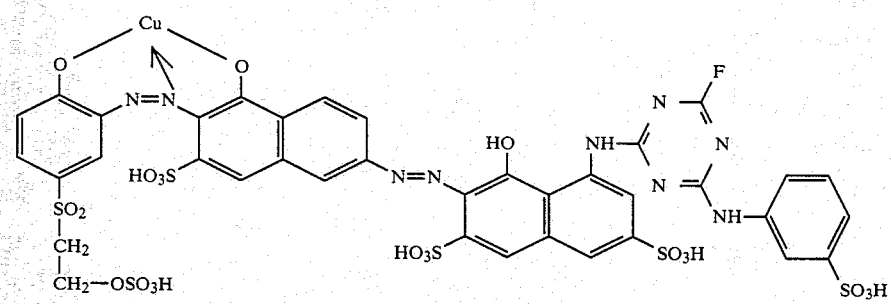

preferably as sodium or potassium salt (prepared by coupling diazotized 2-aminophenol-4-β-sulfatoethylsulfone with 2-amino-5-naphthol-7-sulfonic acid, subsequently diazotizing the reaction product and coupling it with the coupling component mentioned in Example 1 and metallizing the product with copper sulfate), 50 parts of sodium sulfate and 10 parts of sodium hydroxide. The dyeing is then rinsed at the boil and dried. A navy blue dyeing which is very resistant to washing treatments and the action of light, is obtained.

Dyeings having similar properties are obtained if dyeing is carried out, under otherwise constant conditions, using 1 part of sodium hydroxide at 40° C. or 10 parts of trisodium phosphate at 60° C., instead of 10 parts of sodium hydroxide.

EXAMPLE 6

15 parts of the dyestuff which, as the free acid, has the following formula

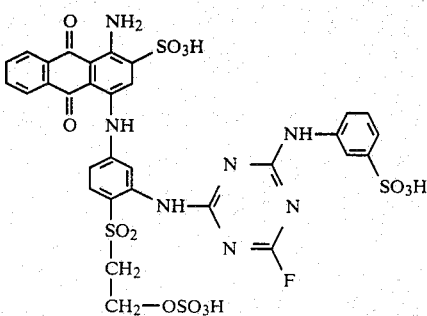

(prepared by subjecting 1-amino-4-bromo-anthraquinone-2-sulfonic acid to a condensation reaction with 1,3-diamino-4-β-hydroxyethylsulfonylbenzene, esterifying the hydroxy group with sulfuric acid and subjecting the product to a condensation reaction with 2-(3'-sulfophenylamino)-4,6-difluoro-1,3,5-triazine) are dissolved, together with 50 parts of urea, in 200 parts of hot water. 400 parts of a thickener composed of 40 parts of sodium alginate and 960 parts of water are added to the solution, while stirring, together with 20 parts of sodium bicarbonate. The mixture is then made up to 1,000 parts with water and a thickener.

The printing paste thus prepared is used to print a cotton fabric which, after being dried, is steamed for 5 minutes at 101° to 103° C., is rinsed with cold water and then with hot water and is soaped at the boil, rinsed again and dried.

A deep blue print which has very good fastness to wet processing and very good fastness to light is obtained.

EXAMPLE 7

30 parts by weight of the dyestuff of the formula

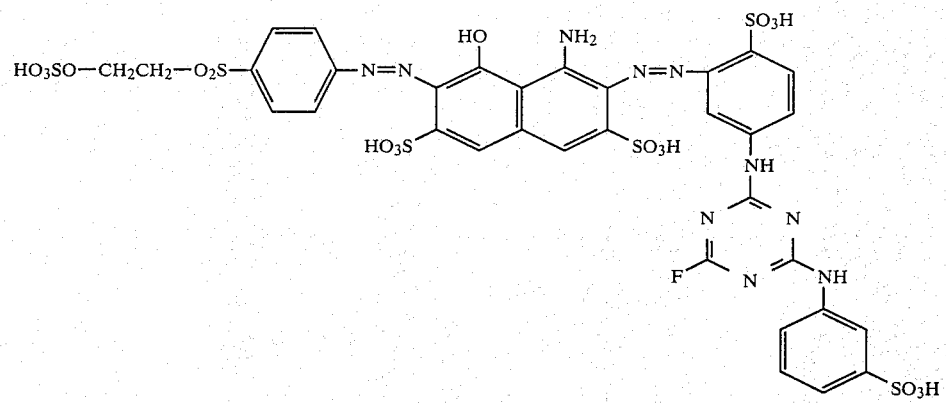

(written in the form of the free acid; prepared by coupling diazotized 2-amino-4-[4'-(3''-sulfophenylamino)-6'-fluoro-1',3',5'-triazin-2'-ylamino]-benzenesulfonic acid in acid solution with 1-amino-8-naphthol-3,6-disulfonic acid and subsequently coupling the monoazo dyestuff in neutral solution with diazotized 4-β-sulfatoethylsulfonylaniline) are dissolved, together with 50 parts of urea, in 200 parts of hot water and 400 parts of a neutral sodium alginate thickener, composed of 40 parts of sodium alginate and 960 parts of water, are added. 25 parts of sodium carbonate are then added and the mixture is made up to 1,000 parts with water and thickener. The printing paste thus prepared is used to print a staple rayon fabric which, after being dried, is steamed for 5 minutes at 101° to 103° C., is given a cold rinse and then a hot rinse, and is rinsed with water, soaped at the boil, rinsed again and finally dried. A black cotton print which is fast to light and washing, is obtained.

EXAMPLE 8

A dyebath is prepared, containing, in 1,000 parts by volume, 10 parts of the dyestuff of the formula (written as the free acid)

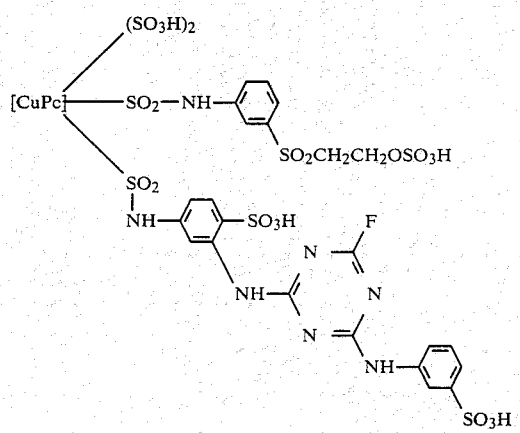

preferably as sodium salt (prepared by subjecting copper phthalocyaninetetrasulfochloride to a condensation reaction with 3-β-sulfatoethylsulfonylaniline and 1,3-diaminobenzene-4-sulfonic acid and subsequently reacting the reaction product stagewise with cyanuric fluoride and aniline-3-sulfonic acid), 75 parts of sodium sulfate, 7 parts of sodium carbonate and 16 parts by volume of 2N sodium hydroxide solution. 50 parts of a cotton yarn are added and are agitated in the bath for 5 minutes at 20° C.; the bath is then heated to 60° C. in the course of 25 to 30 minutes and dyeing is continued for one hour at this temperature while stirring the bath thoroughly.

The dyeing is acidified, given a cold rinse and then a hot rinse, soaped at the boil, rinsed and dried. A deep, turquoise-blue dyeing which has very good fastness properties is obtained.

EXAMPLE 9

A dyebath containing 15 parts of the dyestuff of the formula

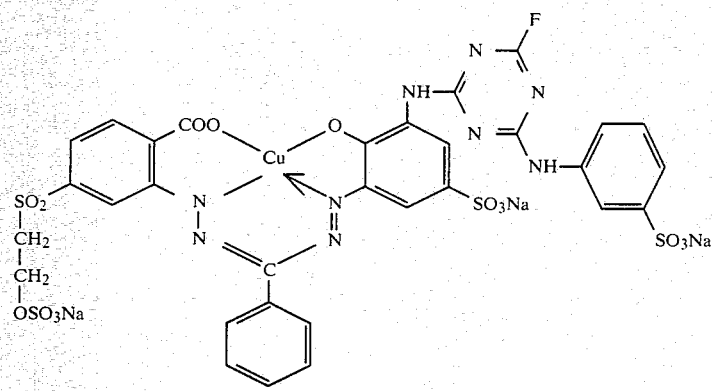

(prepared by reacting N-(2-hydroxy-3-amino-5-sulfophenyl)-N'-(2'-carboxy-5'-β-sulfatoethylsulfonylphenyl)-ms-phenyl-formazan copper complex with cyanuric fluoride and aniline-3-sulfonic acid) is prepared analogously to Example 8. Dyeing, rinsing and drying are carried out at 60° C. under the conditions mentioned in Example 8. A clear blue dyeing which has very good fastness to wet processing is obtained.

A dyeing which hardly differs from the shade previously described and which has equally good properties is obtained if dyeing is carried out with this dyestuff in the same quantity and at the same liquor ratio, but using 90 parts of sodium sulfate and 30 parts of sodium carbonate instead of the quantity of salt and alkali previously indicated, and for 90 minutes at a temperature of 80° C.

EXAMPLE 10

17 parts of the formazan dyestuff of the formula (written in the form of the free acid), as sodium salt,

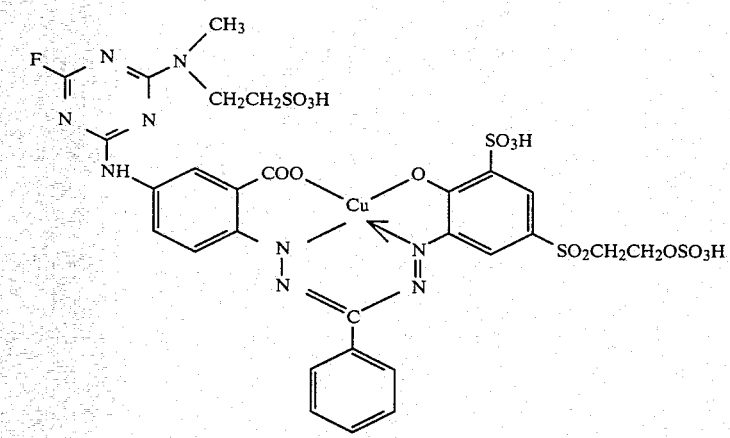

(prepared by reacting the copper complex of N-(2-hydroxy-3-sulfo-5-β-sulfatoethylsulfonylphenyl)-N'-(2'-carboxy-4'-aminophenyl)-ms-(phenyl)-formazan with cyanuric fluoride and subjecting the reaction product to a condensation reaction with N-methyltaurine) are dissolved, together with 50 parts of urea, in 200 parts of hot water and 400 parts of a sodium alginate thickener composed of 40 parts of sodium alginate and 960 parts of water are added. 25 parts of sodium carbonate are then added and the mixture is made up to 1,000 parts with water and thickener.

The printing paste thus prepared is used to print a cotton fabric which, after drying, is steamed for 5 minutes at 101° to 103° C., is rinsed with cold water and then with hot water and is soaped at the boil, rinsed again and dried. A clear blue print which has very good fastness properties is obtained.

EXAMPLE 11

40 parts of the dyestuff described in Example 1 are dissolved, together with 50 parts of urea, in 250 parts of hot water. This solution is stirred into 400 parts of a 4% strength neutral sodium alginate thickener. After the printing paste has cooled, 20 parts of sodium acetate are added. The paste is then made up to 1,000 parts with water or thickener. This printing paste is used to print silk. Fixing is effected by steaming in the customary manner. Vivid, red prints which are fast to wet processing are obtained.

EXAMPLE 12

50 parts of a polyamide fabric are treated for about 10 minutes at 40° C. in 1,500 parts by volume of a liquor containing, as a solution, 1 part of the dyestuff described in Example 2 and 3 parts of crystalline trisodium phosphate. The dyebath is then acidified with acetic acid or sulfuric acid and the fabric is dyed for about 1 hour at the boil. A red dyeing which has very good fastness properties is obtained.

EXAMPLE 13

2.5 parts of the dyestuff described in Example 4 are dissolved in 50 parts of hot water. 100 parts of worsted wool yarn are then dyed for one hour at a pH value of 5 and a temperature of 100° C. with 3,500 parts by volume of a solution containing, in 100 parts of water, 4 parts by volume of 60% strength acetic acid and 25 parts by volume of the above dyestuff solution. The dyed yarn is then rinsed with hot and cold water. A scarlet dyeing which has very good fastness to washing is obtained after drying.

EXAMPLES 14 TO 30

If using the dyestuffs indicated in the following Examples, preferably in form of their alkali metal salts, dyeings and prints are obtained in a manner similar to that described in the preceding Examples, which dyeings have the color shade indicated in the Example and likewise good fastness properties.

| Example | Structural formula of the dyestuff | Color shade |
|---|---|---|
| 14 | 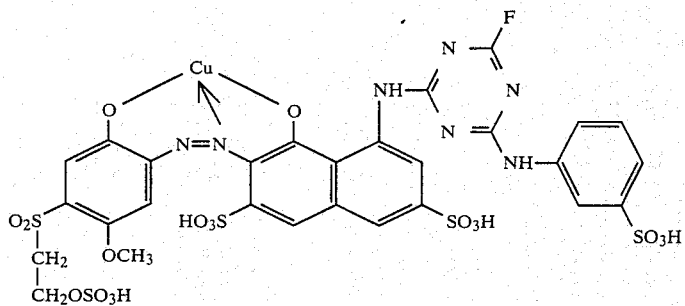 | blue |
| 15 | 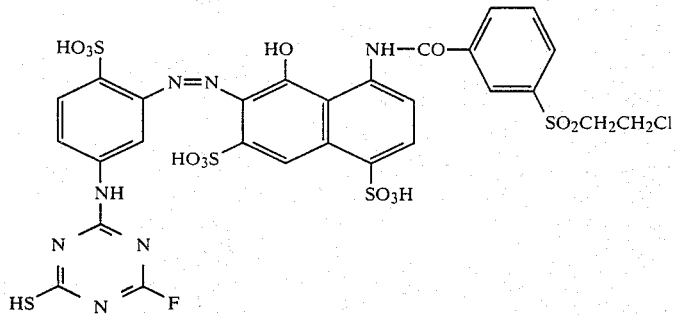 | red |
| 16 | 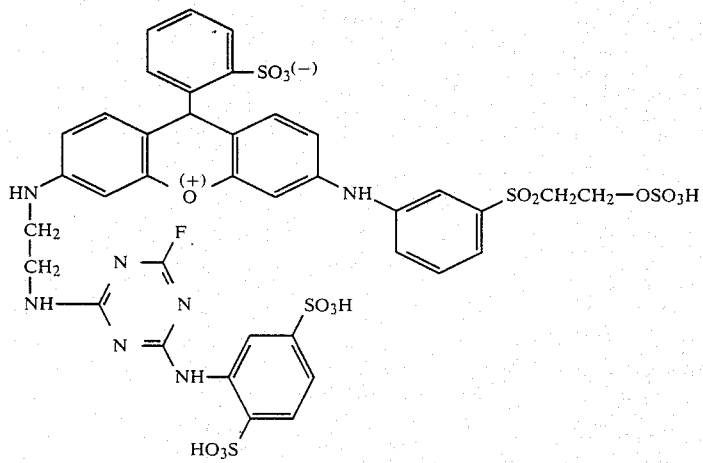 | red |

-continued
| Example | Structural formula of the dyestuff | Color shade |
|---|---|---|
| 17 | 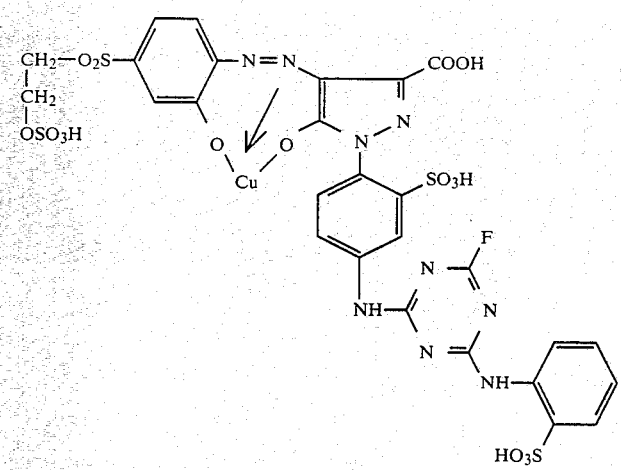 | brown |
| 18 | 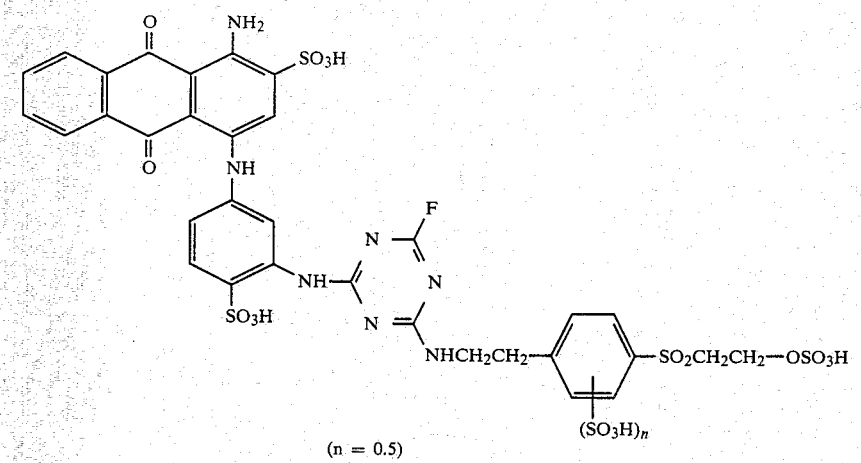 (n = 0.5) | blue |
| 19 | 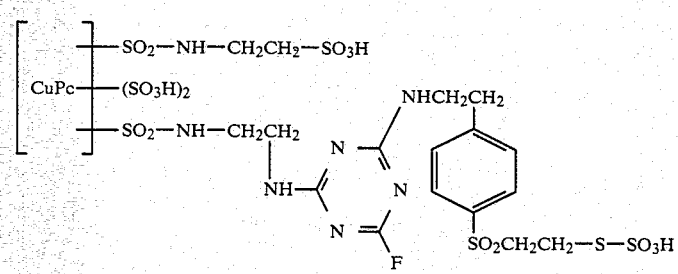 | turquoise-blue |
| 20 | 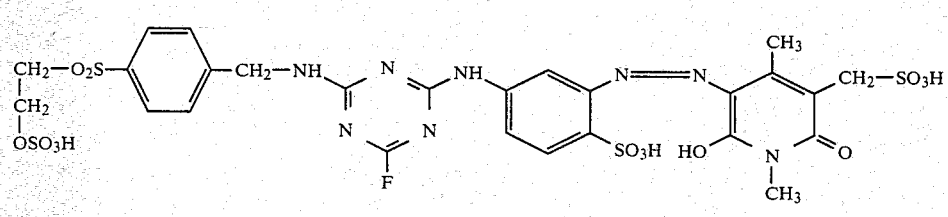 | yellow |

-continued
| Example | Structural formula of the dyestuff | Color shade |
|---|---|---|
| 21 | 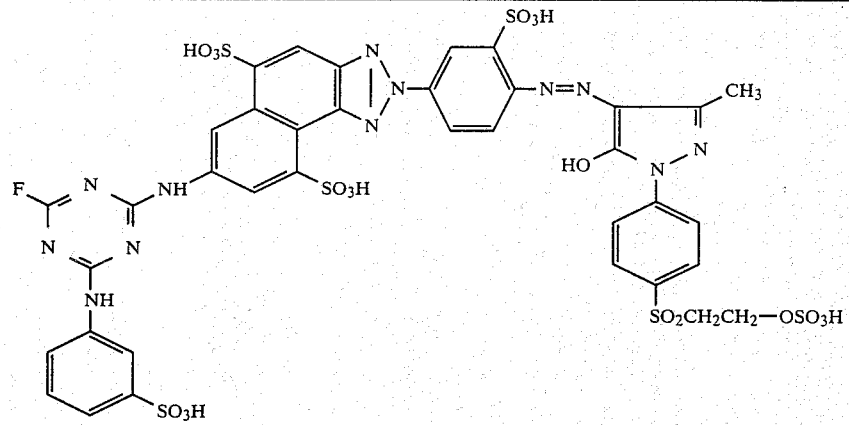 | yellow |
| 22 | 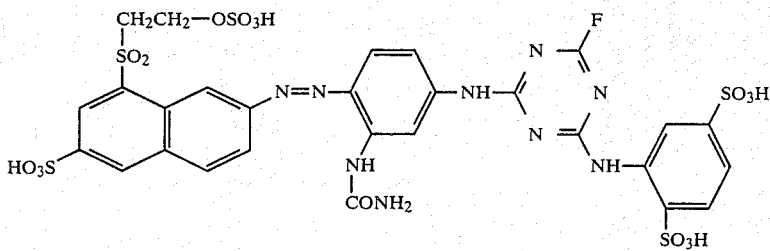 | yellow |
| 23 | 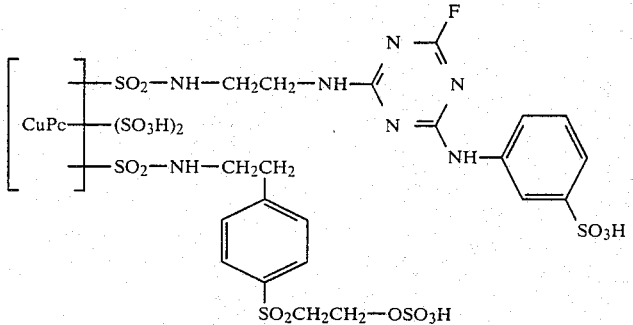 | turquoise-blue |
| 24 | 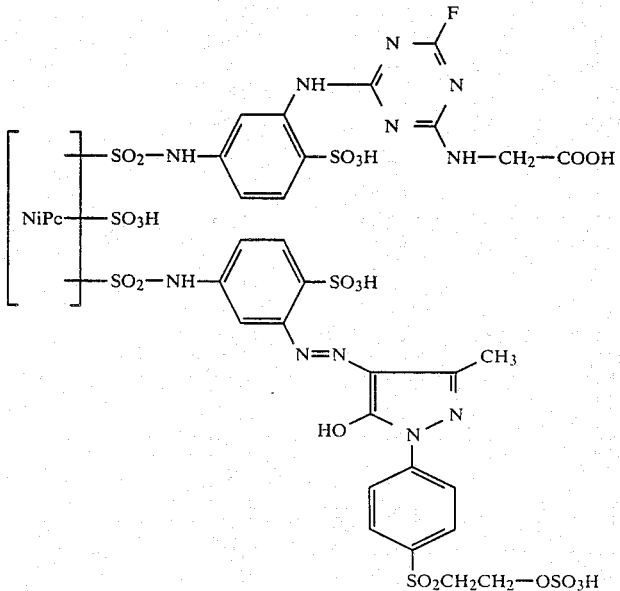 | bluish-tinged green |

| Example | Structural formula of the dyestuff | Color shade |
|---|---|---|
| 25 | 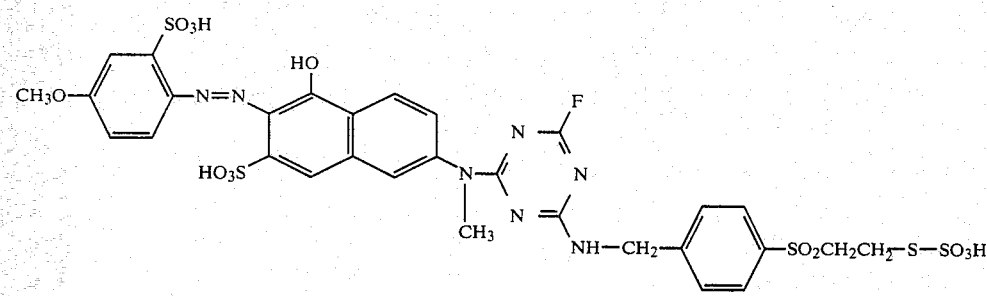 | scarlet |
| 26 | 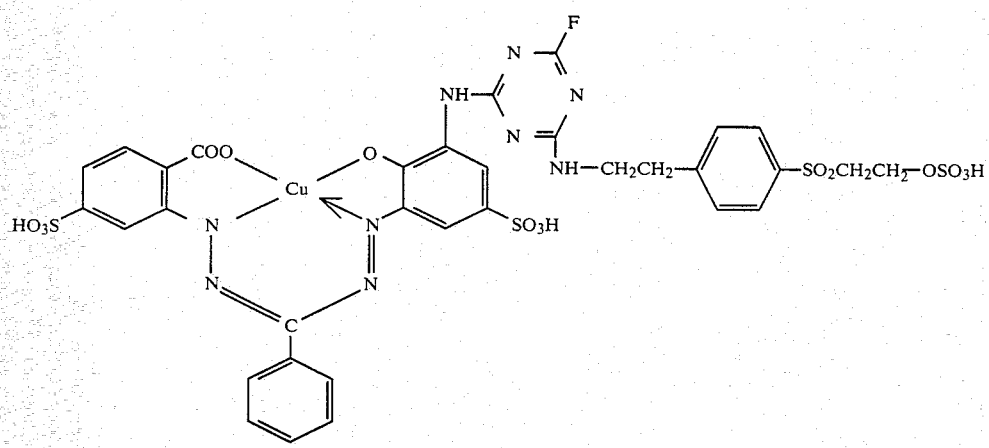 | blue |
| 27 | 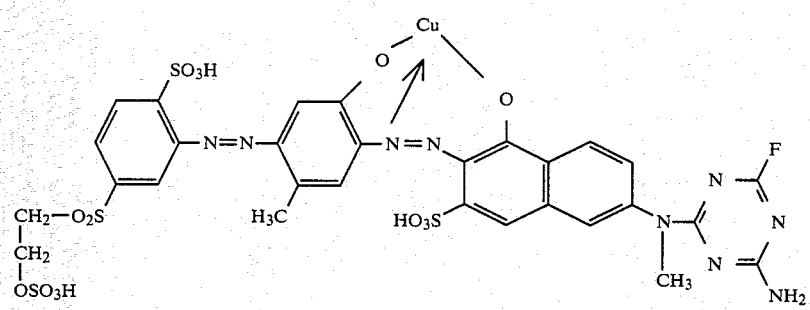 | navy blue |
| 28 | 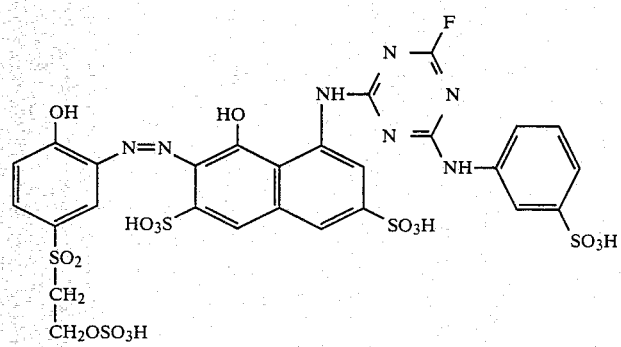 | (a) 1:2 chromium complex: navy blue<br>(b) 1:2 cobalt complex: violet<br>(c) nickel complex: claret |

| Example | Structural formula of the dyestuff | Color shade |
|---|---|---|
| 29 | 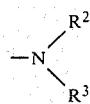 | yellow |
| 30 | | yellow |

We claim:

1. A process for dyeing or printing a fibre material containing hydroxy groups, carbonamide groups or both hydroxy and carbonamide groups, which comprises applying to the fibre material a water-soluble dyestuff containing at least one sulfonic acid group and containing one or more radicals selected from the group consisting of radicals of the formulae $SO_2-CH=CH_2$ $SO_2-CH_2-CH_2-Hal$ and $SO_2-CH_2-CH_2-A$ wherein Hal is halogen and A is an acyloxy radical of a monobasic or polybasic acid, and containing a 6-fluoro-1,3,5-triazin-2-ylamino radical of the formula

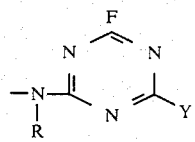

wherein
Y is a group of the formula

$S-R^1$ or

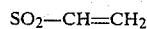

in which
$R^1$ is alkyl of from 1 to 4 carbon atoms unsubstituted or substituted by one or two substituents selected from the group consisting of acetylamino; hydroxy; sulfato; B-sulfatoethylsulfonyl; B-thiosulfatoethylsulfonyl; lower alkoxy; sulfo; carboxy; phenyl; naphthyl; phenyl which is substituted by substituents selected from the group consisting of sulfo, carboxy, β-sulfatoethylsulfonyl, β-thiosulfatoethylsulfonyl, methyl, ethyl, methoxy, ethoxy, chlorine, sulfamoyl and carbamoyl; and naphthyl which is substituted by substituents selected from the group consisting of sulfo, carboxy, β-sulfatoethylsulfonyl, β-thiosulfatoethylsulfonyl, sulfamoyl and carbamoyl; or $R^1$ is phenyl or naphthyl or phenyl substituted by substituents selected from the group consisting of carboxy, sulfo, lower alkyl, lower alkoxy, hydroxy, chlorine and β-sulfatoethylsulfonyl, or is naphthyl substituted by substituents selected from the group consisting of carboxy, sulfo, lower alkyl, lower alkoxy, hydroxy, chlorine and β-sulfatoethylsulfonyl;

R² is hydrogen or lower alkyl or lower alkenyl or lower alkyl substituted by one or two substituents selected from the group consisting of acetylamino; hydroxy; sulfato; β-sulfatoethylsulfonyl; β-thiosulfatoethylsulfonyl; lower alkoxy; sulfo; carboxy; phenyl; naphthyl; phenyl which is substituted by substituents selected from the group consisting of sulfo, carboxy, β-sulfatoethylsulfonyl, β-thiosulfatoethylsulfonyl, methyl, ethyl, methoxy, ethoxy, chlorine, sulfamoyl and carbamoyl; and naphthyl substituted by substituents selected from the group consisting of sulfo, carboxy, β-sulfatoethylsulfonyl, β-thiosulfaoethylsulfonyl, sulfamoyl and carbamoyl; or R² is cyclohexyl; and R³ is hydrogen or lower alkyl or lower alkenyl or lower alkyl substituted by one or two substituents selected from the group consisting of acetylamino; hydroxy; sulfato; β-sulfatoethylsulfonyl; β-thiosulfatoethylsulfonyl; lower alkoxy; sulfo; carboxy; phenyl; naphthyl; phenyl which is substituted by substituents selected from the group consisting of sulfo, carboxy, β-sulfatoethylsulfonyl, β-thiosulfatoethylsulfonyl, methyl, ethyl, methoxy, ethoxy, chlorine, sulfamoyl and carbamoyl and naphythyl substituted by substituents selected from the group consisting of sulfo, carboxy, β-sulfatoethylsulfonyl, β-thiosulfatoethylsulfonyl, sulfamoyl and carbamoyl; or R³ is phenyl or naphthyl or phenyl substituted by substituents selected from the group consisting of carboxy, sulfo, lower alkyl, lower alkoxy, hydroxy and chlorine, or is naphthyl substituted by substituents selected from the group consisting of carboxy, sulfo, lower alkyl, lower alkoxy, hydroxy and chlorine; or R³ is lower alkoxy, cyano or the group —CS—NH₂ or is amino, lower alkylamino, di-(lower alkyl)-amino, N-methyl-N-phenylamino or phenylamino or phenylamino substituted in the phenyl moiety by substituents selected from the group consisting of sulfo, carboxy, chlorine, lower alkyl and lower alkoxy; or R² and R³, together with the nitrogen atom, form a heterocyclic ring containing lower alkyl or containing lower alkyl and one or two hetero atoms; and then fixing said dyestuff on the fibre material at room temperature or at a temperature up to 230° C. in the absence or in the presence of an agent having an alkaline reaction.

2. A process as defined in claim 1, wherein the dyestuff is a 1:1-copper complex azo dyestuff of the compound of the formula

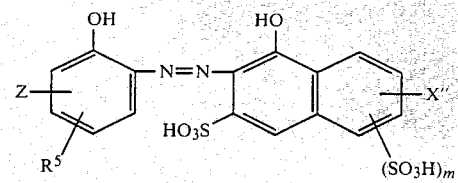

in which Z is the β-sulfatoethylsulfonyl group, X" is a group of the formula

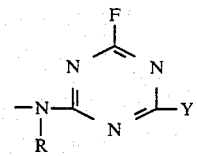

in which R is hydrogen and Y is an amino group of the formula

m is 0 or 1 and R⁵ is hydrogen, methyl, methoxy, ethyl, ethoxy, hydroxy or carboxy.

3. A process as defined in claim 1, wherein the dyestuff employed is a dyestuff of the formula

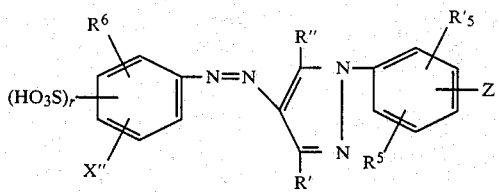

in which Z is the β-sulfatoethylsulfonyl group, X" is a group of the formula

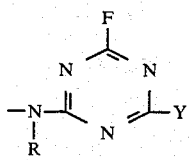

in which R is hydrogen and Y is an amino group of the formula

r is 1 or 2, R' is methyl, carboxy, carbomethoxy or carboethoxy, R" is hydroxy or amino, R⁵ is hydrogen, methyl, methoxy, ethyl, ethoxy, hydroxy or carboxy, R'₅ is hydrogen, methyl, methoxy, ethyl, ethoxy, hydroxy or carboxy, and R⁶ is hydrogen, chlorine, methyl, methoxy, ethoxy, hydroxy or carboxy.

* * * * *

UNITED STATES PATENT AND TRADEMARK OFFICE
CERTIFICATE OF CORRECTION

PATENT NO. : 4,515,598

DATED : May 7, 1985

INVENTOR(S) : Meininger et al.

It is certified that error appears in the above-identified patent and that said Letters Patent is hereby corrected as shown below:

Claim 1, line 19 (column 27, line 64) after "wherein" insert --R is a hydrogen atom or an alkyl group of 1-4 C atoms--.

Signed and Sealed this

Fifteenth Day of October 1985

[SEAL]

Attest:

DONALD J. QUIGG

Attesting Officer

Commissioner of Patents and Trademarks—Designate